United States Patent
Xiao et al.

(10) Patent No.: US 10,560,856 B2
(45) Date of Patent: Feb. 11, 2020

(54) PHASE SHIFTER, ANTENNA, AND BASE STATION

(71) Applicant: Huawei Technologies Co., Ltd., Shenzhen (CN)

(72) Inventors: Weihong Xiao, Shenzhen (CN); Zhiqiang Liao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/907,548

(22) Filed: Feb. 28, 2018

(65) Prior Publication Data
US 2018/0192307 A1    Jul. 5, 2018

Related U.S. Application Data

(63) Continuation of application No. PCT/CN2015/088574, filed on Aug. 31, 2015.

(51) Int. Cl.
*H04W 24/02* (2009.01)
*H01Q 25/00* (2006.01)
*H04W 16/28* (2009.01)
*H04W 88/08* (2009.01)

(52) U.S. Cl.
CPC .......... *H04W 24/02* (2013.01); *H01Q 25/001* (2013.01); *H04W 16/28* (2013.01); *H04W 88/085* (2013.01)

(58) Field of Classification Search
CPC ... H04W 16/28; H04W 24/02; H04W 88/085; H01P 1/184
See application file for complete search history.

(56) References Cited

U.S. PATENT DOCUMENTS

| | | |
|---|---|---|
| 6,850,130 B1 | 2/2005 | Gottl et al. |
| 7,224,247 B2 | 5/2007 | Dean |
| 7,298,233 B2 | 11/2007 | Zimmerman |
| 7,463,190 B2 * | 12/2008 | Zimmerman .......... H01Q 1/243 333/156 |

(Continued)

FOREIGN PATENT DOCUMENTS

| | | |
|---|---|---|
| CN | 1359548 A | 7/2002 |
| CN | 201146243 Y | 11/2008 |

(Continued)

OTHER PUBLICATIONS

"Insertion Loss Measurement Methods",ANRITSU, XP055490269, SiteMaster, (2003).

*Primary Examiner* — Diane D Mizrahi
(74) *Attorney, Agent, or Firm* — Leydig, Voit & Mayer, Ltd.

(57) ABSTRACT

A phase shifter, an antenna, and a base station are provided. The phase shifter in the present invention includes a feed unit, a tapping element, a conductor section, and a ground element, and the feed unit is electrically connected to the tapping element. The tapping element is electrically connected to the ground element when being shifted by a preset angle by using a port of the conductor section as a start position, so that a transmit signal is reflected to an input port of the feed unit, and whether a cable is correctly connected is determined according to the signal of the input port, thereby signal transmission accuracy of an antenna is ensured.

17 Claims, 6 Drawing Sheets

(56) References Cited

U.S. PATENT DOCUMENTS

| | | | |
|---|---|---|---|
| 2006/0077098 A1* | 4/2006 | Zimmerman | H01Q 1/243 |
| | | | 342/372 |
| 2008/0024385 A1* | 1/2008 | Zimmerman | H01Q 1/243 |
| | | | 343/905 |
| 2010/0317297 A1 | 12/2010 | Kratochwil et al. | |
| 2011/0267231 A1 | 11/2011 | Le et al. | |
| 2014/0139401 A1 | 5/2014 | Peng et al. | |
| 2016/0082502 A1* | 3/2016 | Appleby | B22C 9/04 |
| | | | 164/369 |

FOREIGN PATENT DOCUMENTS

| | | |
|---|---|---|
| CN | 102185180 A | 9/2011 |
| CN | 102263313 A | 11/2011 |
| CN | 102714341 A | 10/2012 |
| EP | 2629358 B1 | 7/2015 |
| JP | H11298212 A | 10/1999 |
| JP | 2008124845 A | 5/2008 |

\* cited by examiner

PHASE SHIFTER, ANTENNA, AND BASE STATION

CROSS-REFERENCE TO RELATED APPLICATIONS

This application is a continuation of International Application No. PCT/CN2015/088574, filed on Aug. 31, 2015, the disclosure of which is hereby incorporated by reference in its entirety.

TECHNICAL FIELD

Embodiments of the present invention relate to communications technologies, and in particular, to a phase shifter, an antenna, and a base station.

BACKGROUND

As a main component of an antenna, a phase shifter can adjust a downtilt of an antenna beam by changing phase distribution of all radiating elements of the antenna, so as to improve network coverage and facilitate network optimization.

With development of mobile communications technologies, multi-band and multi-mode communication is also evolving, and a multi-band antenna that supports multi-band and multi-mode communication emerges. The multi-band antenna may include multiple phase shifters, and each phase shifter may be connected to multiple radiating elements. Each phase shifter may adjust, in phases of the multiple radiating elements connected to each phase shifter, an electromagnetic wave signal of a band corresponding to each phase shifter, to implement frequency division on the electromagnetic wave signal of the band in the multiple radiating elements, and emit the electromagnetic wave signal by using each of the multiple radiating elements connected to each phase shifter. Each phase shifter may be connected to a radio remote unit (RRU for short) of a base station by using a cable, so as to receive an electromagnetic wave signal that is of a band corresponding to each phase shifter and sent by the RRU. That is, the multiple phase shifters of the multi-band antenna may be connected to the RRU by using multiple cables.

However, there are a relatively large quantity of cables for connecting the antenna to the RRU. Consequently, a connection error easily occurs, causing the phase shifter to receive an electromagnetic wave signal of an incorrect band, and leading to an error in transmitting a signal by the antenna.

SUMMARY

Embodiments of the present invention provide a phase shifter, an antenna, and a base station, so as to rectify an error in transmitting a signal by the base station.

According to a first aspect, an embodiment of the present invention provides a phase shifter, including: a feed unit, at least one tapping element, at least one conductor section, and a ground element, where the feed unit is electrically connected to a first tapping element of the at least one tapping element, and the at least one tapping element is electrically connected in sequence;

the at least one conductor section is at least one concentric curved conductor section; each tapping element is electrically connected to one conductor section; and each tapping element is shifted, by using a circle center of the at least one conductor section as a rotation axis, along the conductor section connected to each tapping element, so as to change a phase of a signal that passes through the conductor section connected to each tapping element, and then output the signal by using an output port of the conductor section connected to each tapping element; and when each tapping element is shifted by a preset angle by using an output port of the conductor section connected to each tapping element as a start position, one tapping element is electrically connected to the ground element, so that a signal transmitted by the tapping element is reflected to an input port of the feed unit, a standing wave is generated by the signal of the input port, and then whether a cable of the input port is correctly connected is determined according to the signal of the input port.

According to the first aspect, in a first possible implementation of the first aspect, the input port is further connected to a detection element;

the input port is further configured to transmit the signal of the input port to the detection element; and the detection element is further configured to determine, according to the signal of the input port, whether the cable of the input port is correctly connected.

According to the first possible implementation of the first aspect, in a second possible implementation, the detection element is further configured to: determine a standing wave ratio of the signal of the input port according to the signal of the input port; and if the standing wave ratio is greater than a preset standing wave ratio value, determine that the cable of the input port is correctly connected; or if the standing wave ratio is less than or equal to the preset standing wave ratio value, determine that the cable of the input port is incorrectly connected.

According to the first possible implementation of the first aspect, in a third possible implementation, the detection element is further configured to: determine an reflection coefficient of the input port according to the signal of the input port; and if the reflection coefficient of the input port is greater than a preset reflection coefficient value, determine that the cable of the input port is correctly connected; or if the reflection coefficient of the input port is less than or equal to the preset reflection coefficient value, determine that the cable of the input port is incorrectly connected.

According to any one of the first aspect to the third possible implementation of the first aspect, in a fourth possible implementation, the feed unit and the at least one conductor section are both of a microstrip structure; and the ground element is electrically connected to a ground layer of the microstrip structure of the feed unit and/or the at least one conductor section.

According to any one of the first aspect to the third possible implementation of the first aspect, in a fifth possible implementation, the feed unit and the at least one conductor section are both of a stripline structure; and the ground element is electrically connected to a ground layer of the stripline structure of the feed unit and/or the at least one conductor section.

According to any one of the first aspect to the fifth possible implementation of the first aspect, in a sixth possible implementation, the preset angle is an angle that is corresponding to an antenna polarization mode corresponding to the phase shifter, and preset angles are different for phase shifters of different antenna polarization modes.

According to a second aspect, an embodiment of the present invention provides an antenna, including: multiple phase shifters and multiple radiating elements, where each phase shifter is any one of the foregoing phase shifters; and an output port of each phase shifter is connected to one radiating element, and an input port of each phase shifter is connected to a radio remote unit RRU.

According to the second aspect, in a first possible implementation of the second aspect, if the antenna is a single-polarized antenna, when a tapping element is electrically connected to a ground element in each phase shifter, shift angles of the tapping elements are the same.

According to the second aspect, in a second possible implementation of the second aspect, if the antenna is a dual-polarized antenna, when tapping elements are electrically connected to ground elements in phase shifters that are of the multiple phase shifters and corresponding to a same polarization mode, shift angles of the tapping elements are the same; and when tapping elements are electrically connected to ground elements in phase shifters that are of the multiple phase shifters and corresponding to different polarization modes, shift angles of the tapping elements are different.

According to a third aspect, an embodiment of the present invention further provides a base station, including: an antenna, a radio remote unit RRU, and a baseband processing unit BBU; and the antenna includes multiple phase shifters and multiple radiating elements, where each phase shifter is any one of the foregoing phase shifters; an output port of each phase shifter is connected to one radiating element; an input port of each phase shifter is connected to the RRU; and the RRU is connected to the BBU.

According to the phase shifter, the antenna, and the base station provided in the embodiments of the present invention, the phase shifter includes the feed unit, the at least one tapping element, the at least one conductor section, and the ground element. When each tapping element is shifted by the preset angle by using an output port of the conductor section connected to each tapping element as the start position, one tapping element may be electrically connected to the ground element, so that the ground element can reflect, to the input port of the feed unit, the signal transmitted by the tapping element connected to the ground element, the standing wave is generated by the signal of the input port, and then whether the cable of the input port is correctly connected can be determined according to the signal of the input port. This ensures that a cable is correctly connected between an antenna and an RRU and ensures signal transmission accuracy of the antenna.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A phase shifter provided in the embodiments of the present invention may be a phase shifter of an antenna, and the phase shifter may be connected to a radiating element of the antenna. The antenna may be an antenna of a base station, and the phase shifter may be connected to an RRU of the base station by using a cable. The base station may be an evolved NodeB (eNodeB for short). It should be noted that "electrically connected" in the following embodiments of the present invention may be a contacting electrical connection, or may be a coupled electrical connection. This is not limited herein.

Figure 1:
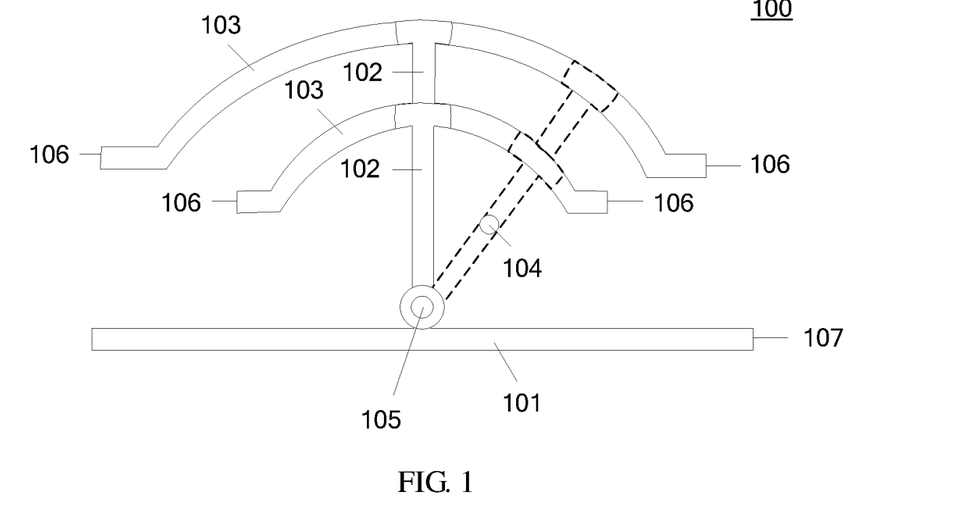
FIG. 1 is a schematic structural diagram of a phase shifter according to Embodiment 1 of the present invention.

Embodiment 1 of the present invention provides a phase shifter. FIG. 1 is a schematic structural diagram of a phase shifter 100 according to Embodiment 1 of the present invention. As shown in FIG. 1, the phase shifter 100 may include a feed unit 101, at least one tapping element 102, at least one conductor section 103, and a ground element 104. The feed unit 101 is electrically connected to the first tapping element of the at least one tapping element 102, and the at least one tapping element 102 is electrically connected in sequence.

The at least one conductor section 103 is at least one concentric curved conductor section. Each tapping element 102 is electrically connected to one conductor section. Each tapping element 102 is shifted, by using a circle center 105 of the at least one conductor section 103 as a rotation axis, along the conductor section connected to each tapping element 102, so as to change a phase of a signal that passes through the conductor section connected to each tapping element 102, and then output the signal by using an output port 106 of the conductor section connected to each tapping element 102.

When each tapping element 102 is shifted by a preset angle by using an output port of the conductor section connected to each tapping element 102 as a start position, one tapping element is electrically connected to the ground element 104, so that a signal transmitted by the tapping element is reflected to an input port 107 of the feed unit 101, a standing wave is generated by the signal of the input port 107, and then whether a cable of the input port 107 is correctly connected is determined according to the signal of the input port 107.

Specifically, the input port 107 of the feed unit 101 may be a signal input port of the phase shifter 100. The input port 107 of the feed unit 101 may be connected to an RRU of a base station by using a DIN connector of a cable, to receive an electromagnetic wave signal output by the RRU. An output port 106 of each of the at least one conductor section 103 may be a signal output port of the phase shifter. An output port 106 of one of the at least one conductor section 103 may be connected to one radiating element.

The at least one conductor section 103 is at least one concentric curved conductor section. Therefore, the at least one conductor section 103 shares a same circle center. A phase variation of signals of two output ports of a conductor section that is closest to the circle center and that is of the at least one conductor section 103 is the smallest, and a phase variation of signals of two output ports of a conductor section that is farthest to the circle center and that is of the at least one conductor section 103 is the largest.

The input port 107 of the feed unit 101 may receive a microwave signal output by the RRU, and each tapping element 102 is shifted, by using the circle center 105 of the at least one conductor section 103 as the rotation axis, along the conductor section connected to each tapping element 102, so as to change a transmission path length of an electromagnetic wave signal in each conductor section, change the phase of the signal that passes through the conductor section connected to each tapping element 102, and then output the signal by using the output port 106 of the conductor section connected to each tapping element 102. The signal output by the output port 106 of the conductor section is an electromagnetic wave signal whose phase changes after the electromagnetic wave signal passes through the phase shifter 100. The signal output by the output port 106 of the conductor section is transmitted to a radiating element connected to the output port 106 of the conductor section and sent to space by using the radiating element. The signal output by the output port 106 of the conductor section is emitted by using the radiating element, and therefore, a downtilt of a beam of an antenna that includes the radiating element and the phase shifter 100 can be changed to meet signal requirements of users in different regions and enhance beam coverage of the base station.

One of the at least one conductor section 103 includes two output ports. A sum of phases of signals output by the two output ports may be 0° or 180°. For example, if a phase of a signal output by one of the output ports is 18°, a phase of a signal output by the other output port may be −18°.

The feed unit 101 may have one or two ports. If the feed unit 101 has one port, the port is the output port. If the feed unit 101 includes two ports, one of the ports may be an input port, and the other port is the output port. It should be noted that, a phase of a signal of the output port of the feed unit 101 may be the same as a phase of a signal of the input port. That is, the phases of the signals of the input port and the output port of the feed unit 101 may keep unchanged. In FIG. 1, the feed unit 101 that includes two ports is merely used as an example. However, the feed unit 101 may have only one port, that is, an input port, and details are not described herein.

A connection point between the first tapping element of the at least one tapping element 102 and the feed unit 101 may include a rotation shaft. An axis of the rotation shaft may be the circle center 105 of the at least one conductor section 103, that is, the rotation axis. Driven by rotation of the rotation shaft, the at least one tapping element 102 may be shifted along the conductor section connected to each tapping element 102.

The ground element 104 may be electrically connected to a ground layer of the phase shifter, and after the tapping element 102 swings by a particular angle, the ground element 104 is electrically connected to the tapping element 102. The ground layer of the phase shifter may be a ground layer corresponding to any structure of the feed unit 101 and the at least one conductor section 103. The ground element 104 may be located in a gap between one of the at least one conductor section 103 and the feed unit 101, or may be located in a gap between any two of the at least one conductor section 103. Grounding is described by using an example in which the ground element 104 is located in a gap between a conductor section and the feed unit 101 and is close to one side of a first output port of the conductor section in FIG. 1. However, the ground element 104 in this embodiment of the present invention may be located in another position, for example, may be located in the gap between the any two of the at least one conductor section 103 or close to one side of a second output port of the conductor section. The first output port and the second output port may be two ports of one conductor section. It should be noted that the first, the second, and the like in this embodiment of the present invention are merely used to describe similar or same features in this embodiment of the present invention, but do not represent ranks or use sequences of corresponding features.

After each tapping element 102 is shifted by the preset angle, one of the at least one tapping element 102 is electrically connected to the ground element 104. Because resistance of the ground element 104 is relatively large and is infinite, the signal transmitted by the tapping element connected to the ground element 104 is reflected to the input port 107 of the feed unit 101, and the reflected signal enables the signal of the input port 107 to generate the standing wave.

The standing wave generated by the signal of the input port 107 is caused due to the ground element 104. The ground element 104 is connected to ground, so that resistance of the ground element 104 is relatively large. Therefore, according to an impedance matching principle, it can be learned that a reflection coefficient of the ground element 104 is relatively large, and a relatively large percentage of the signal is reflected, so that a relatively large standing wave is generated by the signal of the input port 107. In this way, whether the cable of the input port 107 is correctly connected is determined according to the signal of the input port 107. For example, whether the cable of the input port 107 is correctly connected may be determined by using a standing wave ratio and/or a signal reflection coefficient of the signal of the input port 107. The cable of the input port 107 may be, for example, a cable for connecting the input port to the RRU. The standing wave ratio may be a voltage standing wave ratio (VSWR for short). The signal reflection coefficient may be an input reflection coefficient. The input reflection coefficient may be denoted by S11.

According to the phase shifter provided in Embodiment 1 of the present invention, the phase shifter includes the feed unit, the at least one tapping element, the at least one conductor section, and the ground element. When each tapping element is shifted by the preset angle by using an output port of the conductor section connected to each tapping element as the start position, one tapping element may be electrically connected to the ground element, so that the ground element can reflect, to the input port of the feed unit, the signal transmitted by the tapping element connected to the ground element, the standing wave is generated by the signal of the input port, and then whether the cable of the input port is correctly connected can be determined according to the signal of the input port. Therefore, in Embodiment 1 of the present invention, the phase shifter that includes the ground element can determine, according to the signal of the input port of the feed unit of the phase shifter, whether the cable of the input port is correctly connected, and determine whether the cable for connecting the input port of the phase shifter to the RRU is correctly connected. This ensures that a cable is correctly connected between an antenna and an RRU, and ensures signal transmission accuracy of the antenna.

Figure 2:
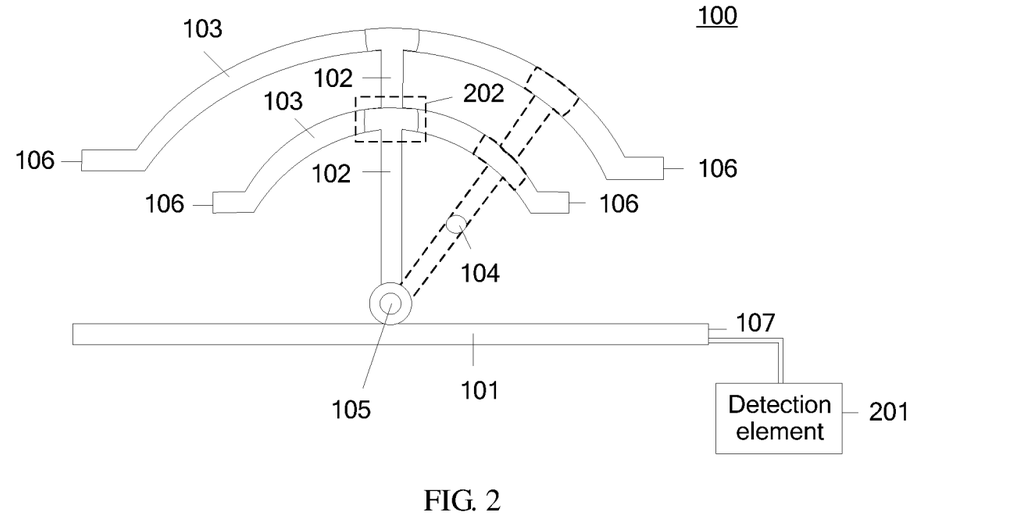
FIG. 2 is a schematic structural diagram of a phase shifter according to Embodiment 2 of the present invention.

Embodiment 2 of the present invention further provides a phase shifter. FIG. 2 is a schematic structural diagram of a phase shifter according to Embodiment 2 of the present invention. As shown in FIG. 2, optionally, the input port 107 of the phase shifter 100 shown in FIG. 1 may be further connected to a detection unit 201.

The input port 107 is further configured to transmit the signal of the input port 107 to the detection element 201. The detection element 201 is further configured to determine, according to the signal of the input port, whether the cable of the input port 107 is correctly connected. The detection element 201 may be, for example, a computer, a processor, or any device having a processing function. Details are not described herein.

Optionally, the detection element 201 is further configured to: determine a standing wave ratio of the signal of the input port 107 according to the signal of the input port 107; and if the standing wave ratio is greater than a preset standing wave ratio value, determine that the cable of the input port 107 is correctly connected; or if the standing wave ratio is less than or equal to the preset standing wave ratio value, determine that the cable of the input port is incorrectly connected.

Alternatively, the detection element 201 may be further configured to: determine a reflection coefficient of the input port according to the signal of the input port 107; and if the reflection coefficient of the input port 107 is greater than a preset reflection coefficient value, determine that the cable of the input port 107 is correctly connected; or if the reflection coefficient of the input port is less than or equal to the preset reflection coefficient value, determine that the cable of the input port 107 is incorrectly connected.

Optionally, the detection element 201 may be further connected to an alarm device, so that an alarm signal is sent when the detection element 201 determines that the cable of the input port 107 is incorrectly connected, so as to notify antenna installation personnel that the cable of the input port 107 is incorrectly connected. For example, the alarm device may be a display device and/or an audio device. If the alarm device is the display device, the alarm signal may be a text signal on the display device. If the alarm device is the audio device, for example, a microphone, the alarm signal may be a sound signal.

Optionally, a sliding device 202 is located between adjacent tapping elements of the at least one tapping element 102. The sliding device 202 includes a connection component.

The adjacent tapping elements of the at least one tapping element 102 are electrically connected by using the connection component of the sliding device 202. Each of the at least one tapping element 102 may be further electrically connected to one of the at least one conductor section 103 by using the connection component.

It should be noted that, the sliding device 202 and the at least one tapping element 102 may be located in one independent printed circuit board (PCB for short).

Optionally, the feed unit 101 and the at least one conductor section 103 are both of a microstrip structure. That is, the phase shifter 100 may be a phase shifter of the microstrip structure. The ground element 104 is electrically connected to a ground layer of the microstrip structure of the feed unit 101 and/or the at least one conductor section.

Specifically, the feed unit 101 and the at least one conductor section 103 may be located on one PCB that is different from a PCB on which the at least one tapping element 102 is located. That is, the phase shifter 100 may include two PCBs. One PCB may include the feed unit 101 and the at least one conductor section 103, and the other PCB may include the at least one tapping element. Therefore, the feed unit 101 and the at least one conductor section 103 may be metal wirings on the PCB. The at least one tapping element 102 may be a metal wiring on the other PCB.

Therefore, the PCB on which the at least one tapping element 102 is located may be rotated by using the circle center 105 of the at least one conductor section 103 as the rotation axis, so that each tapping element 102 can be shifted along the conductor section connected to each tapping element 102.

The feed unit 101 and the at least one conductor section 103 are both of a microstrip structure. That is, the phase shifter 100 may be a phase shifter of the microstrip structure. Because a signal transmission speed is high and interference immunity is poor in the microstrip structure, an antenna that includes the phase shifter of the microstrip structure may be applied to a scenario in which a requirement for a signal transmission rate is relatively high and a requirement for interference immunity is relatively low.

Figure 3:
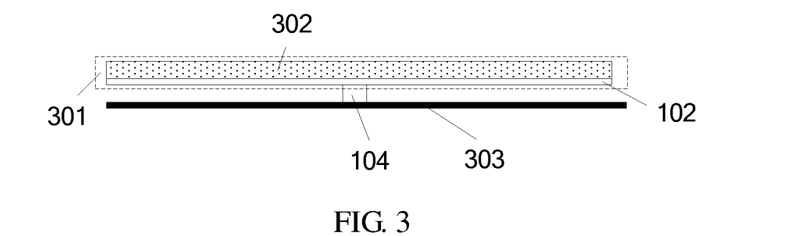
FIG. 3 is a schematic sectional diagram of a phase shifter in which a tapping element is electrically connected to a ground element according to Embodiment 2 of the present invention.

FIG. 3 is a schematic sectional diagram of a phase shifter in which a tapping element is electrically connected to a ground element according to Embodiment 2 of the present invention. As shown in FIG. 3, a PCB 301 includes the tapping element 102 and a PCB medium layer 302. That is, the tapping element 102 may be, for example, a metal wiring on the PCB 301. The tapping element 102 is electrically connected to the ground element 104, and the ground element 104 may be electrically connected to a ground layer 303. The ground layer 303 may be a ground layer of the microstrip structure of the feed unit 101 and/or the at least one conductor section 103. Therefore, the tapping element 102 may be electrically connected to the ground layer 303 by using the ground element 104.

Alternatively, the feed unit 101 and the at least one conductor section 103 are both of a stripline structure. The ground element 104 is electrically connected to a ground layer of the stripline structure of the feed unit 101 and/or the at least one conductor section 103.

Specifically, the stripline structure is also referred to as a suspended microstrip structure, and may include an upper ground layer and a lower ground layer. The upper ground layer further includes a side panel. The upper ground layer may be obtained by using a die-casting process. The lower ground layer may be a cover plate. The lower ground layer may be obtained by using a sheet metal process. The upper ground layer and the lower ground layer are fit together to form a cavity. The feed unit 101, the at least one tapping element 102, and the at least one conductor section 103 may be metal wirings in the cavity of the stripline structure. If the feed unit 101, the at least one tapping element 102, and the at least one conductor section 103 are all of the stripline structure, the phase shifter 100 may be a phase shifter of the stripline structure. Because a signal transmission rate is low and interference immunity is strong in the stripline structure, an antenna that includes the phase shifter of the stripline structure may be applied to an antenna that has a low requirement for a signal transmission rate and a relatively high requirement for interference immunity.

Figure 4:
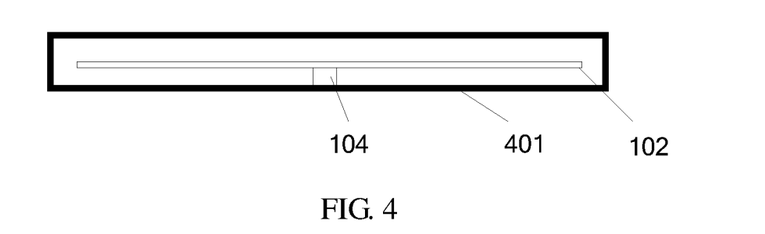
FIG. 4 is a schematic sectional diagram of another phase shifter in which a tapping element is electrically connected to a ground element according to Embodiment 2 of the present invention.

FIG. 4 is a schematic sectional diagram of another phase shifter in which a tapping element is electrically connected to a ground element according to Embodiment 2 of the present invention. As shown in FIG. 4, the tapping element 102 is electrically connected to the ground element 104. The ground element 104 is electrically connected to a ground layer 401. The ground layer 401 may be a ground layer of the stripline structure of the feed unit 101 and/or the at least one conductor section 103. Therefore, the tapping element 102 may be electrically connected to the ground layer 401 by using the ground element 104.

Optionally, the preset angle is an angle corresponding to an antenna polarization mode that is corresponding to the phase shifter 100, and preset angles are different for phase shifters 100 of different antenna polarization modes.

Positions of ground elements in the phase shifters 100 of the different antenna polarization modes are also different.

In the phase shifter in Embodiment 2 of the present invention, because the feed unit, the at least one tapping element, and the at least one conductor section may be all of the microstrip structure or the stripline structure, the phase shifter may be applied to an antenna in different scenarios.

Figure 5:
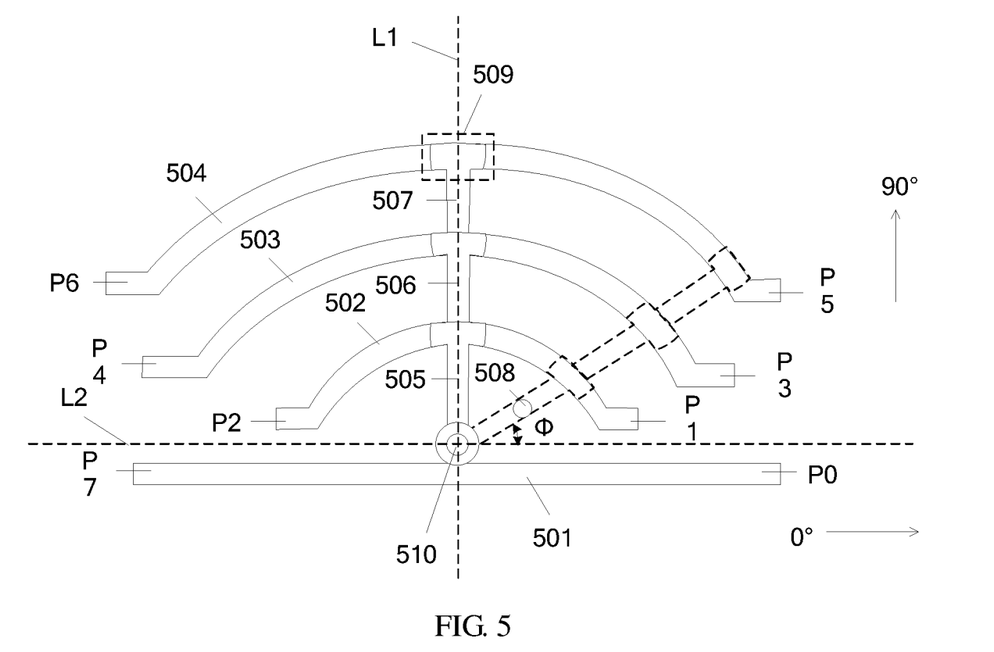
FIG. 5 is a schematic structural diagram of a phase shifter according to Embodiment 3 of the present invention.

Embodiment 3 of the present invention further provides a phase shifter. FIG. 5 is a schematic structural diagram of a phase shifter according to Embodiment 3 of the present invention. The phase shifter may include a feed unit 501, a first conductor section 502, a second conductor section 503, a third conductor section 504, a first tapping element 505, a second tapping element 506, a third tapping element 507, and a ground element 508. The feed unit 501 has an input port P0. The first conductor section 502 has output ports P1 and P2, the second conductor section 503 has output ports P3 and P4, and the third conductor section 504 has output ports P5 and P6. The feed unit 501 further has an output port P7. The first conductor section 502, the second conductor section 503, and the third conductor section 504 may be three curved conductor sections that are concentric on one plane. The first tapping element 505, the second tapping element 506, and the third tapping element 507 may also be located on one plane. The plane on which the first conductor section 502, the second conductor section 503, and the third conductor section 504 are located may be parallel to the plane on which the first tapping element 505, the second tapping element 506, and the third tapping element 507 are located.

The feed unit 501 may be electrically connected to the first tapping element 505. A sliding device 509 is further included between the first tapping element 505 and the second tapping element 506 and between the second tapping element 506 and the third tapping element 507. The sliding device 509 may include a connection component, so that the first tapping element 505 is electrically connected to the second tapping element 506 and the third tapping element 507 in sequence.

The connection component may further enable the first tapping element 505 to be electrically connected to the first conductor section 502, the second tapping element 506 to be electrically connected to the second conductor section 503, and the third tapping element 507 to be electrically connected to the third conductor section 504.

A connection point between the first tapping element 505 and the feed unit 501 further includes a rotation shaft 510. The connection point between the first tapping element 505 and the feed unit 501 may be a circle center of a concentric circle of the first conductor section 502, the second conductor section 503, and the third conductor section 504.

The ground element 508 may be located, for example, in a gap between the first tapping element 505 and the feed unit, and located on the right side of a straight line L1 shown in FIG. 5. The straight line L1 may be a straight line that is perpendicular to the feed unit 501 and on a plane parallel to the plane on which the first ground element 505 is located. In FIG. 5, a straight line L2 may be a straight line that is parallel to the feed unit 501 and on a plane parallel to the plane on which the first ground element 505 is located.

A direction from the first conductor section 502 to the third conductor section 504 in the straight line L1 may be denoted by 90°. A direction from the output port P7 to the input port P0 in the straight line L2 may be denoted by 0°.

Driven by the rotation shaft 510, the first tapping element 505, the second tapping element 506, and the third tapping element 507 may be shifted along conductor sections connected to the first tapping element 505, the second tapping element 506, and the third tapping element 507, so as to change a phase of a signal that passes through a conductor section connected to each tapping element, and then output the signal by using an output port of the conductor section connected to each tapping element.

It should be noted that, a phase variation between the first output port P1 and the second output port P2 may be less than a phase variation between the third output port P3 and the fourth output port P4, and a phase variation between the third output port P3 and the fourth output port P4 may be less than a phase variation between the fifth output port P5 and the sixth output port P6. A ratio of the phase variation between the first output port P1 and the second output port P2 to the phase variation between the third output port P3 and the fourth output port P4 and the phase variation between the fifth output port P5 and the sixth output port P6 may be, for example, 1:2:3. The ratio may be determined by using radii of arcs corresponding to the first conductor section 502, the second conductor section 503, and the third conductor section 504.

If the first tapping element 505 is shifted from 0° to an angle Φ shown in the diagram, the first tapping element 505 may be connected to the ground element 508. The ground element 508 may enable a signal input from the input port P0 to be reflected after the signal passes through the first tapping element 505, and the reflected signal enables a standing wave to be generated on the input port P0. For example, if the ground element 508 is located in the gap between the first tapping element 505 and the feed unit and located on the right side of the straight line L1 shown in FIG. 5, the angle Φ may be greater than 0° and less than 90°. [0°,Φ°] may denote a detection angle of the phase shifter, and (Φ°,180°] may be an operating angle of the phase shifter. The first tapping element 505 shifts counterclockwise from the angle 0° to the angle Φ, so that the phase shifter can be in a detection state. A detection stage in which the phase shifter is in may be an antenna installation stage, that is, a stage in which a phase shifter in an antenna is connected to an RRU. When the phase shifter is in an operating state, a tapping element may be shifted only within an operating angle range, that is, the tapping element is shifted within (Φ°, 180°].

The ground element 508 may be located on the left side of the straight line L1 in FIG. 5. Therefore, the angle Φ may be greater than 90° and less than 180°. [Φ°,180°] may denote a detection angle of the phase shifter, and (Φ°,0°] may be an operating angle of the phase shifter. The first tapping element 505 shifts clockwise from the angle 180° to the angle Φ, so that the phase shifter can be in a detection state. When the phase shifter is in an operating state, a tapping element may be shifted only within an operating angle range, that is, the tapping element is shifted within (Φ°,0°].

That is, the ground element 508 may rotate counterclockwise or may rotate clockwise.

If an antenna in which the phase shifter is located may be a single-polarized antenna, positions of ground elements 508 may be the same in all phase shifters in the antenna. A position of the phase shifter may be denoted by the angle Φ. That the positions of the ground elements 508 are the same means that angles Φ corresponding to the ground elements 508 are the same.

If an antenna in which the phase shifter is located may be a dual-polarized antenna, positions of ground elements 508 may be the same in phase shifters corresponding to a same polarization mode in the antenna, and positions of ground elements are different in phase shifters corresponding to different polarization modes. For example, an angle Φ corresponding to a ground element 508 in a phase shifter corresponding to one polarization mode may be 30°, and an angle Φ corresponding to a ground element 508 in a phase shifter corresponding to another polarization mode may be −30°.

The input port P0 may be further connected to a detection element 511. The detection element 511 may determine a standing wave ratio of a signal of the input port P0 according to the signal of the input port P0; and if the standing wave ratio is greater than a preset standing wave ratio value, determine that a cable of the input port P0 is correctly connected; or if the standing wave ratio is less than or equal to the preset standing wave ratio value, determine that a cable of the input port P0 is incorrectly connected. Alternatively, the detection element 511 may determine a reflection coefficient of the input port P0 according to a signal of the input port P0; and if the reflection coefficient of the input port P0 is greater than a preset reflection coefficient value, determine that a cable of the input port P0 is correctly connected; or if the reflection coefficient of the input port P0 is less than or equal to a preset reflection coefficient value, determine that a cable of the input port is incorrectly connected. If the detection element 511 determines that the cable of the input port P0 is incorrectly connected, an alarm signal may be sent to notify antenna installation personnel that the cable of the input port P0 is incorrectly connected.

Figure 6:
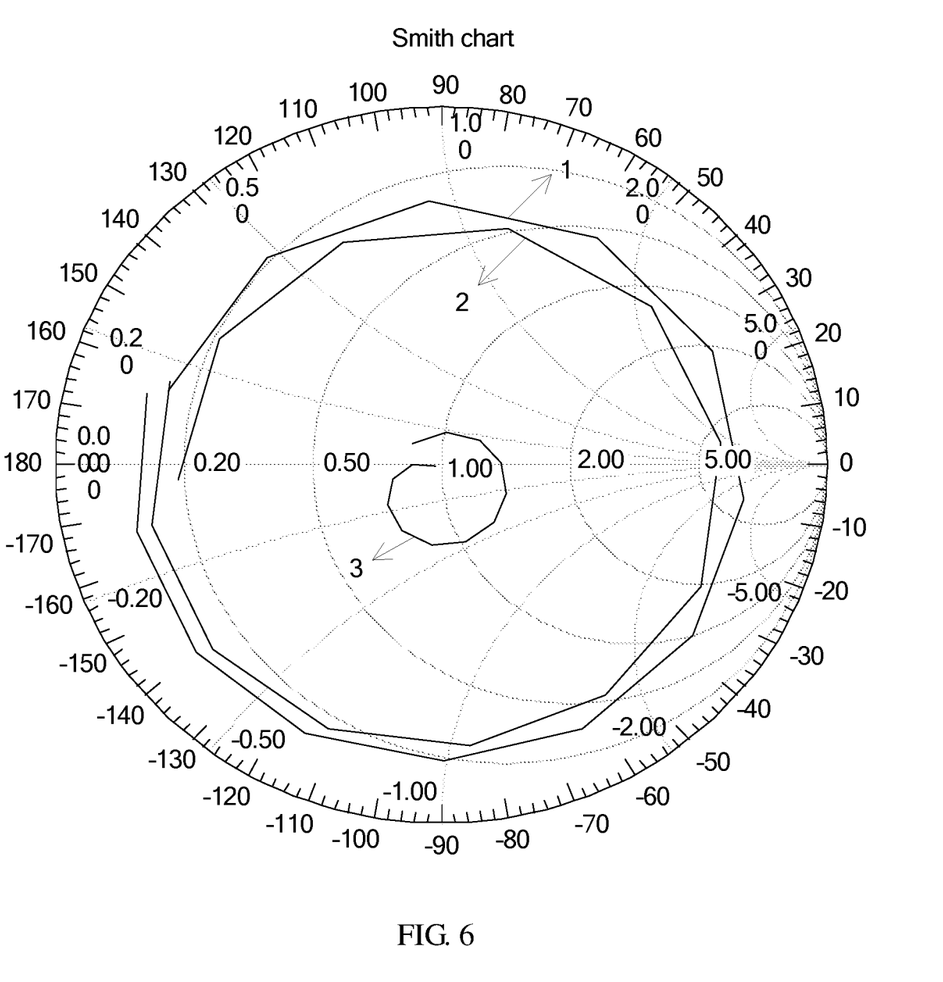
FIG. 6 is a Smith chart of an input port of a phase shifter according to Embodiment 3 of the present invention.
Figure 7:
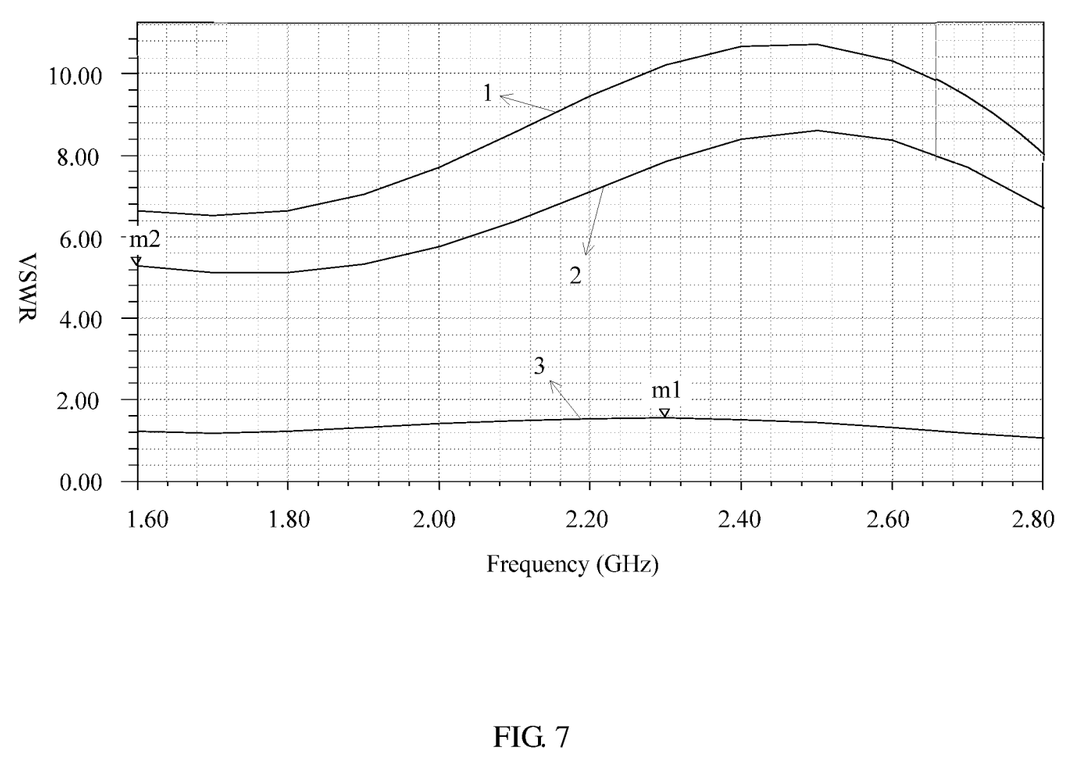
FIG. 7 is a VSWR chart of an input port of a phase shifter according to Embodiment 3 of the present invention.

FIG. 6 is a Smith chart of an input port of a phase shifter according to Embodiment 3 of the present invention. FIG. 7 is a VSWR chart of an input port of a phase shifter according to Embodiment 3 of the present invention.

In FIG. 6, a line 1 may be used to indicate a signal reflection coefficient that is of an input port of a phase shifter corresponding to one antenna polarization mode and that is obtained when a tapping element is electrically connected to a ground element in the phase shifter; a line 2 may be used to indicate a signal reflection coefficient that is of an input port of a phase shifter corresponding to another antenna polarization mode and that is obtained when a tapping element is electrically connected to a ground element in the phase shifter; and a line 3 may indicate a signal reflection coefficient that is of an input port of a phase shifter corresponding to either the antenna polarization mode or the another antenna polarization mode and that is obtained when a tapping element is not electrically connected to a ground element in the phase shifter, that is, in a normal operating state.

In FIG. 7, a line 1 may be used to indicate a VSWR that is of an input port of a phase shifter corresponding to one antenna polarization mode and that is obtained when a tapping element is electrically connected to a ground element in the phase shifter; a line 2 may be used to indicate a VSWR that is of an input port of a phase shifter corresponding to another antenna polarization mode and that is obtained when a tapping element is electrically connected to a ground element in the phase shifter; and a line 3 may indicate a VSWR that is of an input port of a phase shifter corresponding to either the antenna polarization mode or the another antenna polarization mode and that is obtained when a tapping element is not electrically connected to a ground element in the phase shifter, that is, in a normal operating state.

It can be learned from FIG. 6 and FIG. 7 that a VSWR may be greater than a preset standing wave ratio value 1.8 when a tapping element is electrically connected to a ground element in a phase shifter corresponding to any antenna polarization mode, that is, the phase shifter is in a detection state, and the VSWR may be less than the preset standing wave ratio value when the tapping element is not electrically connected to the ground element in the phase shifter, that is, the phase shifter is in an operating state.

In Embodiment 3 of the present invention, the foregoing embodiment is described by using a specific example. Beneficial effects of Embodiment 3 may be similar to those of the foregoing embodiment. Details are not described herein again.

It should be noted that, the feed unit, the conductor sections, and the tapping elements of the phase shifter in FIG. 5 may be all of a microstrip structure or a stripline structure. If the feed unit, the conductor sections, and the tapping elements of the phase shifter in FIG. 5 may be of the microstrip structure, the phase shifter may be a phase shifter of the microstrip structure. If the feed unit, the conductor sections, and the tapping elements of the phase shifter in FIG. 5 may be of the stripline structure, the phase shifter may be a phase shifter of the stripline structure. The feed unit and the conductor sections in FIG. 5 may be located in one PCB, and the tapping elements may be located in another PCB. Therefore, the phase shifter shown in FIG. 5 may enable, by rotating a PCB in which a tapping element is located, the tapping element to shift on a conductor section connected to the tapping element.

Figure 8:
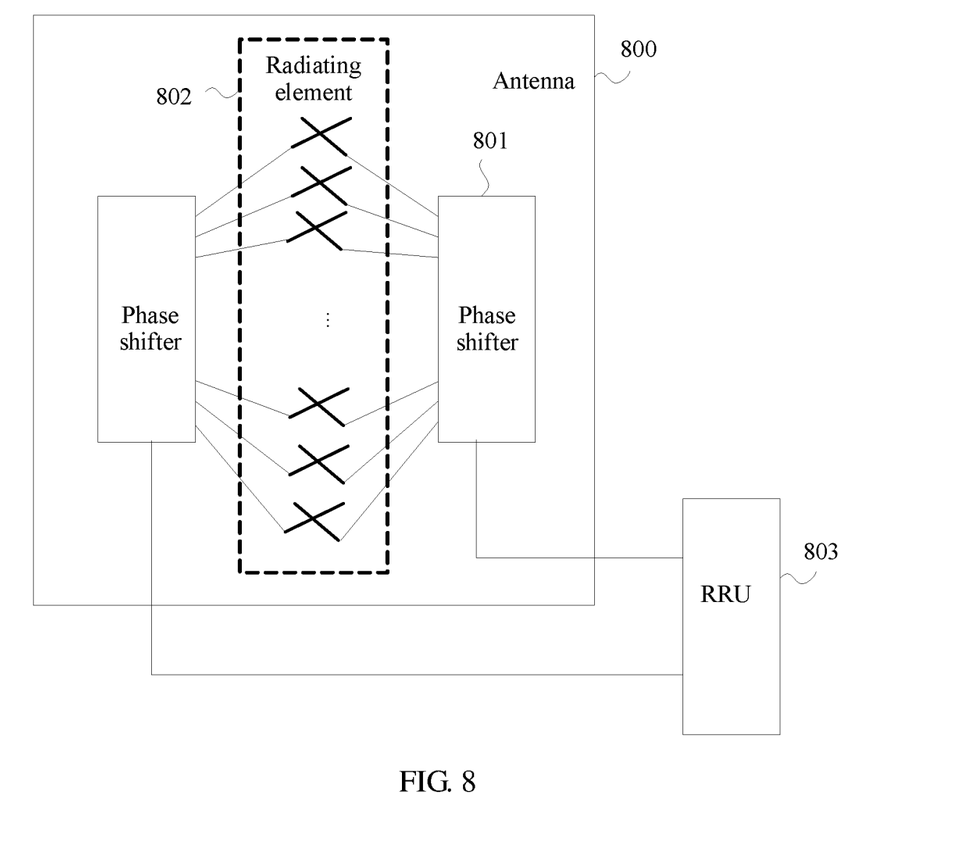
FIG. 8 is a schematic structural diagram of an antenna according to Embodiment 4 of the present invention.

Embodiment 4 of the present invention further provides an antenna. FIG. 8 is a schematic structural diagram of an antenna 800 according to Embodiment 4 of the present invention. As shown in FIG. 8, the antenna 800 includes multiple phase shifters 801 and multiple radiating elements 802. An output port of each phase shifter 801 is connected to one radiating element 802.

An input port of each phase shifter 801 is further connected to an RRU 803 by using multiple cables.

Each phase shifter 801 may be the phase shifter according to any one of Embodiment 1 to Embodiment 3.

Optionally, if the antenna is a single-polarized antenna, when a tapping element is electrically connected to a ground element in each phase shifter, shift angles of the tapping elements are the same.

Optionally, if the antenna is a dual-polarized antenna, when tapping elements are electrically connected to ground elements in phase shifters that are corresponding to a same polarization mode and of the multiple phase shifters 801, shift angles of the tapping elements are the same; or when tapping elements are electrically connected to ground elements in phase shifters that are corresponding to different polarization modes and of the multiple phase shifters 801, shift angles of the tapping elements are different.

The antenna provided in Embodiment 4 of the present invention may include the phase shifter according to any one of Embodiment 1 to Embodiment 3. Beneficial effects of Embodiment 4 may be similar to those of the foregoing embodiment. Details are not described herein again.

Figure 9:
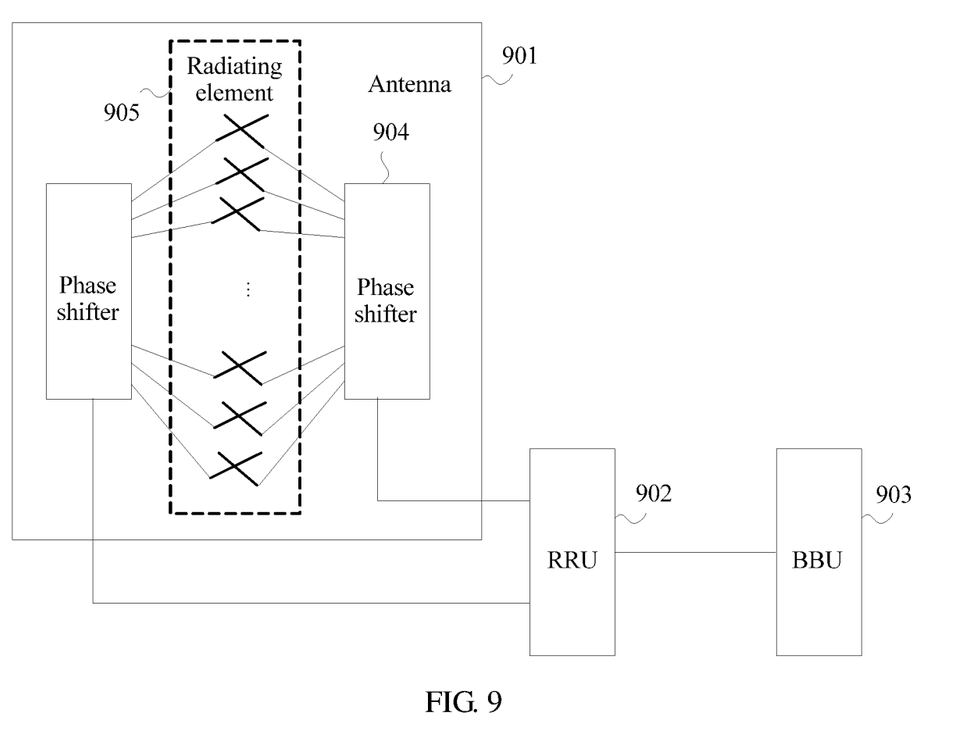
FIG. 9 is a schematic structural diagram of a base station according to Embodiment 5 of the present invention.

Embodiment 5 of the present invention further provides a base station. FIG. 9 is a schematic structural diagram of a base station according to Embodiment 5 of the present invention. As shown in FIG. 9, the base station may include an antenna 901, an RRU 902, and a baseband processing unit (BBU for short) 903.

The antenna 901 includes multiple phase shifters 904 and multiple radiating elements 905. Each phase shifter 904 is the phase shifter according to any one of Embodiment 1 to Embodiment 3. An output port of each phase shifter 904 is connected to one radiating element 905. An input port of each phase shifter 904 is connected to the RRU 902. The RRU 902 is connected to the BBU 903.

The antenna in the base station provided in Embodiment 5 of the present invention may include the phase shifter according to any one of Embodiment 1 to Embodiment 3. Beneficial effects of Embodiment 5 are similar to those of the foregoing embodiment. Details are not described herein again.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A phase shifter, comprising:
   a feed unit,
   at least one tapping element,
   at least one conductor section, and
   a ground element,
   wherein the feed unit is electrically connected to a first tapping element of the at least one tapping element, and the at least one tapping element is electrically connected in sequence;
   wherein the at least one conductor section is at least one concentric curved conductor section; each tapping element is electrically connected to one conductor section; and each tapping element is shifted, by using a circle center of the at least one conductor section as a rotation axis, along the conductor section connected to each tapping element, for changing a phase of a signal of an input port passing through the conductor section connected to each tapping element, and outputting the signal at an output port of the conductor section connected to each tapping element; and
   wherein when each tapping element is shifted by a preset angle from the output port of the conductor section connected to each tapping element as a start position, one tapping element is electrically connected to the ground element, so that:
   a signal transmitted by the tapping element is reflected to an input port of the feed unit, and
   a standing wave is generated by the signal of the input port.

2. The phase shifter according to claim 1, wherein the input port of the feed unit is further connected to a detection element;
   wherein the input port is further configured to transmit the signal of the input port to the detection element; and
   the detection element is further configured to determine, according to the signal of the input port, whether a cable of the input port is correctly connected.

3. The phase shifter according to claim 2, wherein the detection element is further configured to:
   determine a standing wave ratio of the signal of the input port according to the signal of the input port; and
   if the standing wave ratio is greater than a preset standing wave ratio value, determine that the cable of the input port is correctly connected; and
   if the standing wave ratio is less than or equal to the preset standing wave ratio value, determine that the cable of the input port is incorrectly connected.

4. The phase shifter according to claim 2, wherein the detection element is further configured to:
   determine a reflection coefficient of the input port according to the signal of the input port; and if the reflection coefficient of the input port is greater than a preset reflection coefficient value, determine that the cable of the input port is correctly connected; or if the reflection coefficient of the input port is less than or equal to the preset reflection coefficient value, determine that the cable of the input port is incorrectly connected.

5. The phase shifter according to claim 1, wherein the feed unit and the at least one conductor section are both of a microstrip structure; and
   the ground element is electrically connected to a ground layer of the microstrip structure of the feed unit and/or the at least one conductor section.

6. The phase shifter according to claim 1, wherein the feed unit and the at least one conductor section are both of a stripline structure; and
   the ground element is electrically connected to a ground layer of the stripline structure of the feed unit and/or the at least one conductor section.

7. The phase shifter according to claim 1, wherein the preset angle is an angle corresponding to an antenna polarization mode that corresponds to the phase shifter, and the preset angles are different for the phase shifters of different antenna polarization modes.

8. An antenna, comprising:
   multiple phase shifters and multiple radiating elements,
   wherein each of the multiple phase shifter comprises:
   a feed unit,
   at least one tapping element,
   at least one conductor section, and
   a ground element,
   wherein the feed unit is electrically connected to a first tapping element of the at least one tapping element, and the at least one tapping element is electrically connected in sequence;
   wherein the at least one conductor section is at least one concentric curved conductor section; each tapping element is electrically connected to one conductor section; and each tapping element is shifted, by using a circle center of the at least one conductor section as a rotation axis, along the conductor section connected to each tapping element, for changing a phase of a signal of an input port passing through the conductor section connected to each tapping element, and outputting the signal at an output port of the conductor section connected to each tapping element;

wherein when each tapping element is shifted by a preset angle from an output port of the conductor section connected to each tapping element as a start position, one tapping element is electrically connected to the ground element, so that:
 a signal transmitted by the tapping element is reflected to an input port of the feed unit, and
 a standing wave is generated by the signal of the input port; and wherein an output port of each phase shifter of the multiple phase shifters is connected to one radiating element of the multiple radiating elements, and wherein an input port of each phase shifter is connected to a radio remote unit (RRU).

9. The antenna according to claim 8, wherein if the antenna is a single-polarized antenna, when a tapping element is electrically connected to a ground element in each phase shifter, shift angles of the tapping elements are the same.

10. The antenna according to claim 8, wherein if the antenna is a dual-polarized antenna, when tapping elements are electrically connected to ground elements in phase shifters that are of the multiple phase shifters and corresponding to a same polarization mode, shift angles of the tapping elements are the same; and when tapping elements are electrically connected to ground elements in phase shifters that are of the multiple phase shifters and corresponding to different polarization modes, shift angles of the tapping elements are different.

11. The antenna according to claim 8, wherein the input port of the feed unit is further connected to a detection element;

wherein the input port is further configured to transmit the signal of the input port to the detection element; and the detection element is further configured to determine, according to the signal of the input port, whether a cable of the input port is correctly connected.

12. The antenna according to claim 11, wherein the detection element is further configured to:

determine a standing wave ratio of the signal of the input port according to the signal of the input port; and if the standing wave ratio is greater than a preset standing wave ratio value, determine that the cable of the input port is correctly connected; and if the standing wave ratio is less than or equal to the preset standing wave ratio value, determine that the cable of the input port is incorrectly connected.

13. A base station, comprising:
an antenna,
a radio remote unit (RRU), and
a baseband processing unit (BBU),
wherein the antenna comprises multiple phase shifters and multiple radiating elements,
wherein each phase shifter of the multiple phase shifters comprises:
 a feed unit,
 at least one tapping element,
 at least one conductor section, and
 a ground element, wherein the feed unit is electrically connected to a first tapping element of the at least one tapping element, and the at least one tapping element is electrically connected in sequence;

wherein the at least one conductor section is at least one concentric curved conductor section; each tapping element is electrically connected to one conductor section; and each tapping element is shifted, by using a circle center of the at least one conductor section as a rotation axis, along the conductor section connected to each tapping element, for changing a phase of a signal of an input port passing through the conductor section connected to each tapping element, and outputting the signal at an output port of the conductor section connected to each tapping element;

wherein when each tapping element is shifted by a preset angle from an output port of the conductor section connected to each tapping element as a start position, one tapping element is electrically connected to the ground element, so that:
 a signal transmitted by the tapping element is reflected to an input port of the feed unit, and
 a standing wave is generated by the signal of the input port;

wherein an output port of each phase shifter of the multiple phase shifters is connected to one radiating element of the multiple radiating elements;

wherein an input port of each phase shifter of the multiple phase shifters is connected to the RRU; and wherein the RRU is connected to the BBU.

14. The base station according to claim 13, wherein the antenna is a single-polarized antenna, and when a tapping element is electrically connected to a ground element in each phase shifter, shift angles of the tapping elements are the same.

15. The base station according to claim 13, wherein the antenna is a dual-polarized antenna, and wherein:

when tapping elements are electrically connected to ground elements in phase shifters that are of the multiple phase shifters and corresponding to a same polarization mode, shift angles of the tapping elements are the same; and when tapping elements are electrically connected to ground elements in phase shifters that are of the multiple phase shifters and corresponding to different polarization modes, shift angles of the tapping elements are different.

16. The base station according to claim 13, wherein the input port of the feed unit is further connected to a detection element;

wherein the input port is further configured to transmit the signal of the input port to the detection element; and the detection element is further configured to determine, according to the signal of the input port, whether a cable of the input port is correctly connected.

17. The base station according to claim 16, wherein the detection element is further configured to:

determine a standing wave ratio of the signal of the input port according to the signal of the input port; and if the standing wave ratio is greater than a preset standing wave ratio value, determine that the cable of the input port is correctly connected; and if the standing wave ratio is less than or equal to the preset standing wave ratio value, determine that the cable of the input port is incorrectly connected.

* * * * *